United States Patent [19]

Jankowiak et al.

[11] 4,002,345
[45] Jan. 11, 1977

[54] SEAL ASSEMBLY SEQUENTIALLY PROVIDING SPACED SEAL ZONES

[75] Inventors: Roman Jankowiak, Cheektowaga; David M. Okonzak, Elma, both of N.Y.

[73] Assignee: Conax Corporation, Buffalo, N.Y.

[22] Filed: Nov. 3, 1975

[21] Appl. No.: 628,233

[52] U.S. Cl. .............................. 277/110; 277/124; 285/341
[51] Int. Cl.² ......................................... F16J 15/08
[58] Field of Search .......... 277/110, 112, 190, 117, 277/124; 285/341

[56] References Cited

UNITED STATES PATENTS

| | | | |
|---|---|---|---|
| 2,075,947 | 8/1937 | Kennedy | 277/117 X |
| 2,772,100 | 11/1956 | Kreissig et al. | 285/351 X |
| 3,215,457 | 11/1965 | Teeters | 285/341 |
| 3,893,716 | 7/1975 | Moreiras | 285/341 |
| 3,895,831 | 7/1975 | Fisher | 285/341 |

*Primary Examiner*—Robert I. Smith
*Attorney, Agent, or Firm*—Sommer & Sommer

[57] ABSTRACT

A seal assembly is adapted to provide a seal between a body member and an object, having a cylindrical outer surface, arranged to penetrate an opening provided through the body member. The seal assembly includes a lead ferrule having a frusto-conical first surface adapted to engage a body member circular shoulder edge, and having a frusto-conical second surface; an intermediate follower having one circular edge adapted to engage the lead ferrule second surface; a rear ferrule having a frusto-conical third surface adapted to engage another circular edge of the intermediate follower; and a compression cap adapted to exert a longitudinal force on the rear ferrule. When the compression cap is tightened, the seal assembly sequentially provides three longitudinally-spaced seal zones, and a seal between the body member and the object.

9 Claims, 8 Drawing Figures

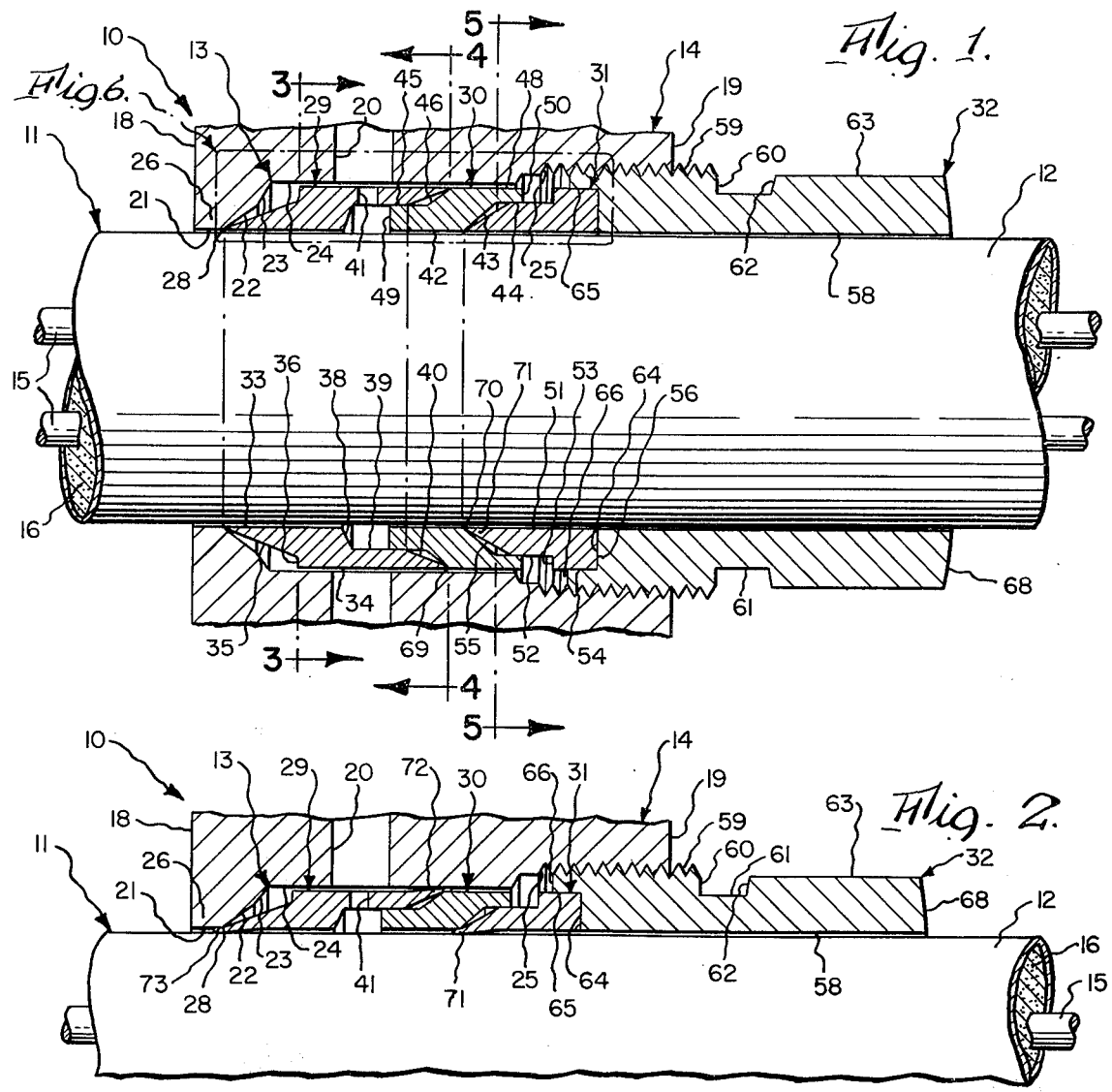

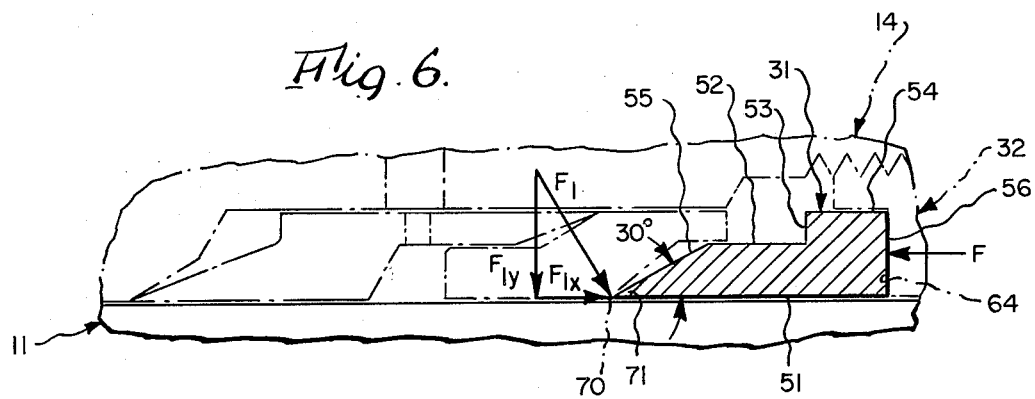
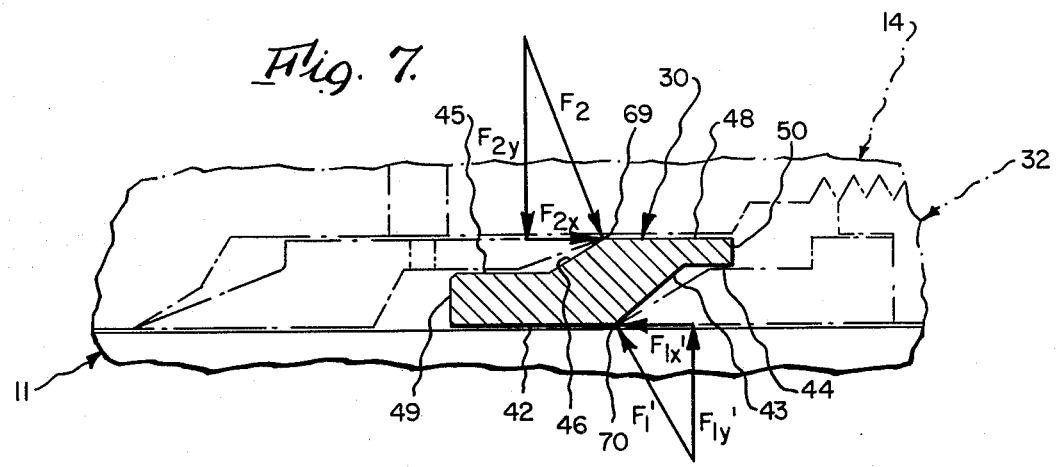
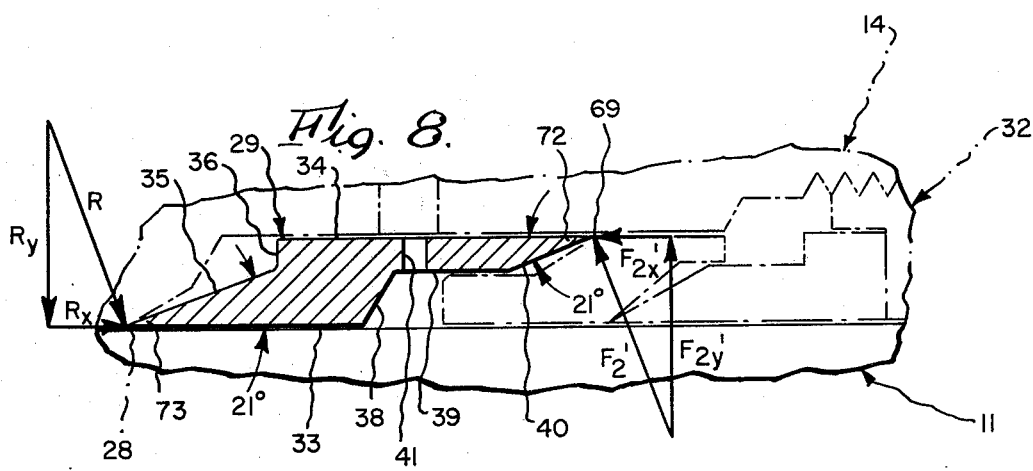

SEAL ASSEMBLY SEQUENTIALLY PROVIDING SPACED SEAL ZONES

BACKGROUND OF THE INVENTION

1. Field of the Invention

The present invention relates generally to apparatus for providing a seal between a body member and an object arranged to penetrate the body member, and more particularly to an improved seal assembly which is adapted to sequentially provide three longitudinally-spaced seal zones to provide an effective seal between the object and body member.

2. Description of the Prior Art

Other forms of seal assemblies for providing a seal between a body member and an object arranged to penetrate an opening through the body member, have been developed.

One pertinent example of such a prior art seal assembly is shown in Fisher U.S. Pat. No. 3,895,831, assigned to the assignee of the present invention, which discloses structure for simultaneously providing multiple seal zones. However, one disadvantage of such structure is the tendency of the rear split ferrules to first engage the object and the body member, the effect of such premature engagement being to prevent the applied force from being properly transmitted to adequately seal the front ferrule.

SUMMARY OF THE INVENTION

The present invention provides novel structure which is adapted to provide an effective seal between a body member and an object, having a cylindrical outer surface, which is arranged to penetrate an opening provided through the body member.

The inventive seal assembly broadly includes a lead ferrule surrounding the object and having a forwardly-convergent frusto-conical first surface adapted to engage a rearwardly-facing annular shoulder of the body member, and having a rearwardly-divergent frusto-conical second surface; an intermediate follower surrounding the object and having a forwardly-facing annular shoulder adapted to engage the lead ferrule second surface; a rear ferrule surrounding the object and having a forwardly-convergent third surface adapted to engage a rearwardly-facing annular shoulder of the follower; and thrust means, such as a compression cap, arranged to selectively exert a desired longitudinal force on the rear ferrule. The ferrules are configured such that the unit load exerted on the first surface is greater than the unit load exerted on the second surface, which is greater than the unit load exerted on the third surface. When the thrust means is caused to exert a desired longitudinal force on the rear ferrule, the seal assembly sequentially provides three longitudinally-spaced seal zones, and provides an effective seal between the body member and the penetrant object.

The unit load on any of the three surfaces may be varied by adjusting the angle of convergence of the surface, or by adjusting the effective diameter at which the load is applied, or both, as desired.

Accordingly, one general object of the present invention is to provide an improved seal assembly which is adapted to provide an effective seal between a body member and a penetrant object.

Another object is to provide an improved seal assembly which is adapted to provide three longitudinally-spaced seal zones sequentially, rather than simultaneously.

Another object is to provide such a seal assembly which may be installed from one side of a body member.

Another object is to provide such a seal assembly which may be adjusted, serviced, maintained, and removed and replaced from one side of the body member.

Still another object is to provide such a seal assembly having an internal sealed chamber between spaced seal zones, by use of which chamber the integrity of the seal zones may be monitored.

These and other objects and advantages will become apparent from the foregoing and ongoing specification, the drawings, and the appended claims.

BRIEF DESCRIPTION OF THE DRAWING FIGURES

FIG. 1 is a fragmentary vertical longitudinal sectional view of the inventive seal assembly positioned between a body member, shown in section, and a cylindrical object, shown in side elevation, arranged to penetrate an opening provided through the body member, this view illustrating the initial arrangement and cross-sectional configuration of the lead ferrule, the intermediate follower, the rear ferrule, and the compression cap, before the cap is selectively tightened to sequentially provide the three longitudinally-spaced seal zones.

FIG. 2 is a fragmentary vertical longitudinal sectional view of the upper portion of the seal assembly depicted in FIG. 1, this view illustrating the arrangement and configuration of the various seal assembly components after the compression cap has been further tightened.

FIG. 3 is a fragmentary transverse vertical sectional view thereof, taken generally on line 3—3 of FIG. 1, illustrating the circular line of contact between the body member shoulder edge and the lead ferrule frusto-conical first surface.

FIG. 4 is a fragmentary transverse vertical sectional view thereof, taken generally on line 4—4 of FIG. 1, illustrating the circular line of contact between the follower forward edge and the lead ferrule frusto-conical second surface.

FIG. 5 is a fragmentary transverse vertical sectional view thereof, taken generally on line 5—5 of FIG. 1, illustrating the circular line of contact between the follower rearward edge and the rear ferrule frusto-conical third surface.

FIG. 6 is a further enlarged fragmentary longitudinal vertical sectional view of the structure bounded by line 6—6 of FIG. 1, this view schematically depicting the equilibrium forces acting on the rear ferrule.

FIG. 7 is a view generally similar to FIG. 6, but schematically depicting the equilibrium forces acting on the intermediate follower.

FIG. 8 is a view generally similar to FIG. 6, but schematically depicting the equilibrium forces acting on the lead ferrule.

DESCRIPTION OF THE PREFERRED EMBODIMENTS

At the outset, it should be clearly understood that like reference numerals are intended to identify the same elements and/or structure consistently throughout the several drawing figures, as such elements and/or structure may be further described or explained by the entire written specification of which this detailed description is an integral part.

The present invention provides an improved seal assembly of the general type disclosed in the aforementioned U.S. Pat. No. 3,895,831, the aggregate disclosure of which is hereby incorporated by reference.

Referring initially to FIG. 1, the present invention provides a unique seal assembly, of which the presently preferred embodiment is generally indicated at 10, which is adapted to provide an effective seal between an object, generally indicated at 11, having a cylindrical outer surface 12, which is arranged to penetrate an opening 13 provided through a body member, generally indicated at 14.

For purposes of illustration, the penetrant object 11 is depicted as being a horizontally-elongated sheathed electrical connector having a pair of transversely-spaced longitudinally-extending conductors 15 suitably embedded in a core of dielectric insulating material 16, and enclosed within a tube-like metal sheath having the cylindrical outer surface 12. However, as used herein, the term "object" is intended in a generic sense to include any object or member having an outer cylindrical surface portion. Accordingly, the particular "object" depicted herein constitutes only one species of a broader genus. Besides the electrical connector herein illustrated and described, other species of such "objects" typically include thermocouples, pipes, tubes, and the like.

Similarly, the term "body member", as used herein is also intended in a generic sense, and should not be construed as being limited to the particular species thereof herein illustrated and described.

Still referring to FIG. 1, the body member 14 is shown as being a vertical plate-like member having leftward and rightward planar vertical faces 18, 19, respectively, and provided with a vertical port or passageway 20 communicating with the body member opening 13 for a purpose hereinafter explained. This body member opening, generally indicated at 13, is shown as being bounded by, from left to right in FIG. 1, a leftward cylindrical surface portion 21 extending rightwardly from body member left face 18, a rightwardly-divergent frusto-conical surface portion 22 continuing rightwardly from cylindrical portion 21, a further inclined rightwardly-divergent frusto-conical surface portion 23 continuing rightwardly from surface 22, a horizontally-elongated cylindrical surface portion 24 continuing rightwardly from surface 23, and an internally-threaded portion 25 continuing rightwardly from surface portion 24 and terminating at body member right face 19. Thus, if one were to look axially into the body member opening from a position to the right of body member right face 19, the visible frusto-conical surfaces 23, 23 would appear to define an annular shoulder 26 extending radially into the opening 13, this shoulder having a lowermost pointed circular edge 28 defined by the intersection of leftward cylindrical surface portion 21 and frusto-conical surface portion 22.

The presently preferred embodiment of seal assembly 10 is shown as broadly including a lead ferrule, generally indicated at 29; an intermediate follower, generally indicated at 30, a rear ferrule, generally indicated at 31; and thrust means, generally indicated at 32.

The lead ferrule 29 is shown as being an annular ring-like member having an inner cylindrical surface 33 spaced from and arranged to face the object cylindrical outer surface 12; a concentric outer cylindrical surface 34, of greater diameter than inner surface 33, spaced from and arranged to face body member cylindrical surface portion 24; a leftward forwardly-facing end face including a rightwardly-divergent frusto-conical first surface 35 joining the inner surface 33 at its forward end, and joining, at its rearward end, a forwardly-facing annular vertical surface 36 extending radially outwardly to join outer surface 34; and a rightward rearwardly-facing end face including a rearwardly-divergent frusto-conical surface 38 joining the ferrule inner surface 33 at its convergent end and joining, at its divergent end, an intermediate cylindrical surface 39 concentric with the ferrule inner and outer surfaces 33, 34, and which, at its rightward end, joins the convergent end of a rightwardly-divergent frusto-conical second surface 40 having its divergent end joining ferrule outer surface 34. This lead ferrule 29 may be conveniently constructed of stainless steel, or equivalent, and be further provided with a radial through hole 41 extending between outer surface 34 and rear end face cylindrical surface 39 for a purpose hereinafter explained.

The intermediate follower 30 is shown as being an annular ring-like member having an inner surface including a leftward cylindrical surface portion 42 spaced from and arranged to face object outer surface 12, an intermediate rightwardly-divergent frusto-conical surface portion 43, and a rightward cylindrical surface portion 44; an outer surface including a leftward cylindrical surface portion 45 arranged to slidably engage lead ferrule surface 39, an intermediate rightwardly-divergent frusto-conical surface portion 46, and a rightward cylindrical surface portion 48 spaced from and arranged to face body member cylindrical surface portion 24; a forwardly-facing annular vertical left end face 49; and a rearwardly-facing annular vertical right end face 50.

The rear ferrule 31 is also shown as being an annular ring-like member having an inner cylindrical surface 51 spaced from and arranged to face the object outer surface 12; an outer surface spaced from and arranged to face the cylindrical and threaded surface portions 24, 25 of the body member, and including a leftward cylindrical surface portion 52, a forwardly-facing annular vertical shoulder 53, and a concentric rightward cylindrical surface portion 54; a leftwardly-convergent frusto-conical left end face or third surface 55 joining inner cylindrical surface 51 and outer surface leftward cylindrical portion 52; and an annular vertical right end face 56 extending between inner cylindrical surface 51 and outer surface rightward cylindrical portion 54.

The thrust means 32 is shown as being a tubular compression cap having a central horizontal longitudinal throughbore bounded by a cylindrical inner surface 58 spaced from but arranged to face the object outer surface 12; an outer surface including a leftward externally-threaded portion 59 adapted to matingly engage the internally-threaded portion 25 of the body member, a rightwardly-facing annular vertical shoulder 60, a cylindrical surface 61, a leftwardly-facing annular vertical shoulder 62, and a rightward polygonal head surface 63, preferably hexagonal, which is adapted to permit application of a suitable tool (not shown), such as a wrench, by which the compression cap may be selectively tightened or loosened with respect to the body member; a leftward end face including a leftwardly-facing annular vertical surface portion 64 extending outwardly from the left end of inner surface 58, an intermediate forwardly-extending cylindrical surface portion 65 concentric with the inner surface 58, and a leftwardly-facing annular vertical surface portion 66 extending outwardly to join outer surface threaded portion 59; and a rightwardly-convergent frusto-conical right end face 68.

Preferably, the ferrules 29, 31, the intermediate follower 30, and the compression cap 32 are severally formed of a suitable hard metal material, such as stainless steel or equivalent, although the ferrules may be made of copper or a copper alloy, as desired.

In the presently preferred embodiment herein illustrated and described, the angle of divergence of the lead ferrule first and second frusto-conical surfaces 35, 40, respectively, is a 21° with respect to the longitudinal axis of the object (FIG. 8), it being appreciated that the radius ($r_2$) from this axis to the midpoint of second surface 40 is greater than the corresponding radius ($r_1$) to the midpoint of the first surface 35, as best shown in FIGS. 3 and 4. It should be further noted that the angle of divergence of rear ferrule third surface 55 is 30° with respect to the longitudinal axis of the object (FIG. 8).

Prior to sealing engagement, the various components of the inventive seal assembly 10 are initially positioned or assembled as shown in FIG. 1. In this initial position, an inner portion of the lead ferrule first surface 35 is adapted to engage the circular edge 28 of the body member in circular line contact; an outer portion of the lead ferrule second surface 40 is adapted to engage the circular edge 69 of the intermediate follower 30 in circular line contact, which edge 69 is defined by the intersection of follower outer surface portions 46 and 48; an inner portion of the rear ferrule third surface 55 is adapted to engage the circular edge 70 of the intermediate follower in line contact, which edge 70 is defined by the intersection of follower inner surface portions 42 and 43; and the forwardly-facing annular vertical surface 64 of the compression cap 32 is adapted to engage the rearwardly-facing right end bearing surface 56 of the rear follower in annular area contact.

OPERATION

The operation of the inventive seal assembly is best understood by reference to FIGS. 6–8 in which the structure of the seal assembly has been depicted schematically so that the forces applied to such structure may be graphically represented for visual clarity. Moreover, in FIGS. 6–8, the forces have been drawn to scale so that the relative magnitudes of the various forces may be visually appreciated. In other words, the longer the force line, the greater the force.

Initially, the lead ferrule, the intermediate follower, the rear ferrule, and the compression cap are positioned and arranged with respect to the body member opening and object as shown in FIGS. 1 and 6. In this position, the compression cap is threaded into the body member so that the various surfaces previously described will contact one another.

For the purpose of illustrating the principle of the present invention, the various other surfaces of the ferrules and follower are schematically depicted in FIGS. 6–8 as not having any sliding contact with respect to each other, the body member, or the object, as the case may be. In other words, in FIGS. 6–8, the only contact shown is between body member edge 28 and lead ferrule first surface 35, follower forwardly-facing edge 69 and lead ferrule second surface 40, follower rearwardly-facing edge 70 and rear ferrule third surface 55, and rear ferrule bearing surface 56 and compression cap bearing surface 64. By initially ignoring the effect of friction due to longitudinal sliding of one part on another, it is felt that the principle of operation of the present invention may be best understood.

For a structure to remain in equilibrium, the radial and longitudinal forces must be resisted by equal and opposite reaction forces. Moreover, it is well understood that forces transmitted to an element through point or line contact with one surface of the element, will act normal (i.e., perpendicular) to that surface.

Referring now to FIG. 6, when the compression cap 32 is further tightened from this initial position, the applied longitudinal or axial force (F) exerted by the cap on the rear ferrule bearing surface 56 will be resisted in equilibrium by a force ($F_1$) exerted by the follower rear edge 70 on the rear ferrule third surface 55 and acting normal to this surface. This resisting force ($F_1$) may be thought of as having a longitudinal or axial component ($F_{1x}$) equal and opposite to the applied force (F) and a perpendicular or radial component ($F_{1y}$) which urges a lower forward marginal portion 71 of the rear ferrule to deform into sealing engagement with an adjacent portion of the object cylindrical surface 12. However, in equilibrium, it will be appreciated that a reaction force ($F_1'$) equal and opposite to force ($F_1$) will be exerted by the rear ferrule third surface 55 on the intermediate follower rear edge 70, this force ($F_1'$) being depicted in FIG. 7.

Referring now principally to FIG. 7, the reaction force ($F_1'$) transmitted by the rear ferrule third surface 55 on the follower rear edge 70 will be resisted in equilibrium by a reaction force ($F_2$) exerted by the lead ferrule second surface 40 on the follower forward edge 69, which force ($F_2$) will act normal to surface 40. This force ($F_2$) may be thought of as having a longitudinal component ($F_{2x}$) equal and opposite to the longitudinal force component ($F_{1x}'$) applied to the follower, and a radial component ($F_{2y}$). However, in equilibrium, it will be appreciated that a force ($F_2'$) equal and opposite to force ($F_2$) will be exerted by the follower forward edge 69 on the lead ferrule second surface 40, this force ($F_2'$) being depicted in FIG. 8.

Referring now to FIG. 8, the force ($F_2'$) transmitted to the lead ferrule second surface 40 by the follower forward edge 69 may be thought of as having a longitudinal component ($F_{2x}'$) and a radial component ($F_{2y}'$) which urges a rearward marginal portion 72 of the lead ferrule to deform into sealing engagement with an adjacent portion of the body member cylindrical surface 24. This force ($F_2'$) exerted on the lead ferrule second surface 40 will be resisted in equilibrium by a resisting force (R) exerted by the body member edge 28 on the lead ferrule first surface 35, this resisting force (R) acting normal to the first surface 35. This resisting force (R) may be thought of as having a longitudinal component ($R_x$) equal and opposite to the longitudinal component ($F_{2x}'$) of the applied force, and a radial component ($R_y$) which urges a forward marginal portion 73 of the lead ferrule to deform into sealing engagement with an adjacent portion of the object outer surface 12.

Since the angles of convergence of the first and second surfaces 35, 40 are both 21°, the radial components, ($F_{2y}'$) and ($R_y$), respectively, of the forces acting on these surfaces will be equal in magnitude. However, since the diameter (D) of the circular line of contact 74 between the follower forward edge 69 and the lead ferrule second surface 40, is greater than the diameter (d) of the circular line of contact 75 between the body member edge 28 and the lead ferrule first surface 35, the radial force ($F_{2y}'$) acting on the second surface 40 will have a smaller radial unit load than the radial force ($R_y$) acting on the first surface 35. As used herein, the expression "radial unit load" is defined as the amount of radial force per unit length of circular line contact, or the amount of radial force per unit area of area contact.

Therefore, when seal assembly 10 is initially positioned as in FIGS. 1 and 6 and the compression cap is further tightened to exert a progressively increasing axial force (F) on the rear ferrule bearing surface 56, the greatest radial unit load ($R_y \div \pi d$) will urge the forward marginal portion 73 of the lead ferrule to deform into sealing engagement with an adjacent portion of body member cylindrical surface 24; an intermediate radial unit load ($F_{2y}' \div \pi D$) will urge the rearward marginal portion 72 of the lead ferrule to deform into sealing engagement with an adjacent portion of the body member cylindrical surface 24; and the smallest radial unit load ($F_{1y} \div \pi d$) will urge the forward marginal portion 71 of the rear ferrule to deform into sealing engagement with an adjacent portion of the object cylindrical surface 12. Because of this differential in radial unit loading, the forward marginal portion 73 of the lead ferrule is first forced into sealing engagement with the object, after which the rearward marginal portion 72 of the lead ferrule is forced into sealing engagement with the body member, after which the forward marginal portion 71 of the rear ferrule is forced into sealing engagement with the object. Otherwise stated, these three seal zones are provided sequentially, rather than simultaneously.

After the compression cap has been suitably tightened to sequentially provide the three axially-spaced seal zones (FIG. 2), a suitable test gas, such as helium, may be introduced into body member port 20, and a suitable leak detector (not shown) may be used to monitor the integrity of seals.

While in the presently preferred embodiment, the first and second surfaces 35, 40 are shown as having an angle of convergence of 21°, and the third surface is shown as having an angle of convergence of 30°, it will be readily appreciated by persons skilled in this art that the relative magnitudes of such angles of convergence may be varied to obtain like results. Therefore, while selection of the specific angles of convergence is a matter of design choice, the fundamental design criteria is that the radial unit load should be greatest proximate the forward marginal portion 73 of the lead ferrule, smaller proximate the rearward marginal portion 72 of the lead ferrule, and smallest proximate the forward marginal portion 71 of the rear ferrule. As heretofore explained, the parameters of each radial unit load are the angle of surface convergence, which affects the magnitude of the radial component of a force acting normal thereto, and the effective diameter of the line of contact with this surface. These parameters may be varied either singly, or in tandem, to obtain the relative radial unit loads desired. Of course, one skilled in this art will realize that area contact may be substituted for line contact, it being appreciated that such substitution will tend to further decrease the radial unit load by distributing the radial force component over such area.

Of course, relative sliding movement of the various facing surfaces will introduce friction, heretofore ignored for the purpose of illustration, having the effect of resisting the various longitudinal force components.

Therefore, the present invention provides a unique seal assembly adapted to sequentially provide three axially-spaced seal zones by virtue of the relative magnitudes of the radial unit loads applied to three deformable ferrule marginal portions.

While the presently preferred embodiment has been shown and described, it will be understood by persons skilled in this art that various additional changes and modifications may be made without departing from the spirit of the invention which is defined generically by the following claims.

What is claimed is:

1. A seal assembly adapted to provide a seal between a body member having an opening therethrough and an object having a cylindrical outer surface arranged to penetrate said opening, said body member being bounded by a cylindrical surface portion and a rearwardly-facing annular shoulder, said seal assembly comprising:

a lead ferrule surrounding said object and having a forwardly-convergent frusto-conical first surface proximate its front end adapted to engage said body member shoulder to receive a radial unit load, and having a rearwardly-divergent frusto-conical second surface proximate its rear end, said second surface being adapted to receive a smaller radial unit load than said first surface;

an intermediate annular follower surrounding said object and having a forwardly-facing annular shoulder adapted to engage said second surface, and having a rearwardly-facing annular shoulder;

a rear ferrule surrounding said object and having a forwardly-convergent frusto-conical third surface adapted to engage said rearwardly-facing follower shoulder, and having a bearing surface proximate its rear end, said third surface being adapted to receive a smaller radial unit load than said second surface; and thrust means surrounding said object and adapted to selectively exert a desired longitudinal force on said rear ferrule bearing surface, whereby, when said thrust means exerts such desired force, seal zones are sequentially provided between a forward marginal portion of said lead ferrule and said object, a rearward marginal portion of said lead ferrule and said body member, and a forward marginal portion of said rear ferrule and said object, to provide a seal between such penetrant object and said body member.

2. A seal assembly as set forth in claim 1 wherein said body member shoulder engages said first surface in circular line contact.

3. A seal assembly as set forth in claim 2 wherein said forwardly-facing follower shoulder engages said second surface in circular line contact.

4. A seal assembly as set forth in claim 3 wherein the diameter of said line contact with said second surface is greater than the diameter of said line contact with said first surface.

5. A seal assembly as set forth in claim 4 wherein the angle of convergence of said first surface is equal to the angle of divergence of said second surface.

6. A seal assembly as set forth in claim 1 wherein said rearwardly-facing follower shoulder engages said third surface in circular line contact.

7. A seal assembly as set forth in claim 1 wherein the angle of convergence of said third surface is greater than the angle of convergence of said first surface and the angle of divergence of said second surface.

8. A seal assembly as set forth in claim 2 wherein said rearwardly-facing follower shoulder engages said third surface in circular line contact, and wherein the diameter of said line of contact with said third surface is substantially equal to the diameter of contact with said first surface.

9. A seal assembly as set forth in claim 8 wherein said forwardly-facing follower shoulder engages said second surface in circular line contact, and wherein the diameter of said line of contact with said second surface is greater than the diameters of said lines of contact with each of said first and third surfaces.

* * * * *

UNITED STATES PATENT OFFICE
CERTIFICATE OF CORRECTION

Patent No. 4,002,345　　　　　　　　　　Dated January 11, 1977

Inventor(s) Roman Jankowiak and David M. Okonzak

It is certified that error appears in the above-identified patent and that said Letters Patent are hereby corrected as shown below:

On the cover sheet:

>　　Column 1:　Maurice W. Connell, Clarence, New York, should be listed as a joint inventor.

Signed and Sealed this

Fifteenth Day of March 1977

[SEAL]

Attest:

RUTH C. MASON
*Attesting Officer*

C. MARSHALL DANN
*Commissioner of Patents and Trademarks*